US009088912B2

(12) United States Patent
Ou

(10) Patent No.: US 9,088,912 B2
(45) Date of Patent: Jul. 21, 2015

(54) METHOD FOR REDUCING OVERHEAD IN A MEASUREMENT REPORT FROM A USER EQUIPMENT CONFIGURED WITH CARRIER AGGREGATION TO A NETWORK IN A WIRELESS COMMUNICATION SYSTEM

(75) Inventor: Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 125 days.

(21) Appl. No.: 13/227,029

(22) Filed: Sep. 7, 2011

(65) Prior Publication Data

US 2012/0057527 A1  Mar. 8, 2012

Related U.S. Application Data

(60) Provisional application No. 61/380,331, filed on Sep. 7, 2010.

(51) Int. Cl.
H04W 24/10 (2009.01)
H04W 36/00 (2009.01)

(52) U.S. Cl.
CPC .......... H04W 24/10 (2013.01); H04W 36/0094 (2013.01)

(58) Field of Classification Search
CPC ............ H04W 24/10; H04W 36/0083; H04W 36/0088; H04W 36/0094; H04W 64/00
USPC ........ 370/329–331, 338, 252; 455/436, 456.1
See application file for complete search history.

(56) References Cited

U.S. PATENT DOCUMENTS

2008/0014957 A1*  1/2008 Ore ........................... 455/452.1
2008/0227453 A1*  9/2008 Somasundaram et al. .... 455/436
2009/0196197 A1*  8/2009 DiGirolamo et al. ......... 370/252
2009/0197598 A1*  8/2009 Fischer ........................ 455/434
2010/0172428 A1    7/2010 Pani et al.
2010/0190488 A1*  7/2010 Jung et al. .................... 455/424

(Continued)

FOREIGN PATENT DOCUMENTS

EP    2086258 A1    8/2009
EP    2166802 A1    3/2010

(Continued)

OTHER PUBLICATIONS

Change Request, 3GPP TSG-RAN WG2 Meeting #71, Introduction of Carrier Aggregation, Madrid, Spain, R2-104991, Aug. 23-27, 2010.*

(Continued)

Primary Examiner — Benjamin Lamont

(74) Attorney, Agent, or Firm — Blue Capital Law Firm, P.C.

(57) ABSTRACT

A method and apparatus for providing a measurement report from a User Equipment (UE) to a network in a wireless communication system according to one embodiment includes using a configuration to indicate whether or not a corresponding additional measurement result should be included in the measurement report, and using the configuration to indicate more than one type of additional measurement result. A method and apparatus for providing a measurement report from a UE to a network in a wireless communication system according to another embodiment includes triggering a measurement report, and omitting an additional measurement result in the measurement report if the measurement report is triggered by inter-Radio Access Technology measurement (inter-RAT measurement).

28 Claims, 5 Drawing Sheets

(56) References Cited

U.S. PATENT DOCUMENTS

| | | | |
|---|---|---|---|
| 2010/0279638 A1* | 11/2010 | Lindoff | 455/226.1 |
| 2011/0141952 A1* | 6/2011 | Wang et al. | 370/294 |
| 2011/0176430 A1* | 7/2011 | Zetterberg et al. | 370/242 |
| 2011/0212693 A1* | 9/2011 | Sagfors et al. | 455/67.11 |
| 2011/0281578 A1* | 11/2011 | Narasimha et al. | 455/423 |
| 2012/0004010 A1* | 1/2012 | Tamura et al. | 455/525 |
| 2012/0039302 A1* | 2/2012 | Chun et al. | 370/331 |
| 2012/0094608 A1* | 4/2012 | Shi et al. | 455/67.11 |
| 2012/0269172 A1* | 10/2012 | Chin et al. | 370/332 |

FOREIGN PATENT DOCUMENTS

| | | |
|---|---|---|
| JP | 2011519508 A | 7/2011 |
| KR | 1020100088085 A | 8/2010 |

OTHER PUBLICATIONS

3GPP TSG RAN WG2 Meeting. #71, Madrid, Spain, Aug. 23-27, 2010 (R1-104511).

3GPP TSG RAN WG2 #71bis, Xi'an, China, Oct. 11-15, 2010 (Tdoc R2-105532).

3GPP TSG-RAN WG22#70 meeting, Montreal, Canada, May 10-14, 2010 (Tdoc R2-103116).

3GPP TSG-RAN WG2 meeting #71, Madrid, Spain, Aug. 23-27, 2010 (R1-104314).

3GPP 3GPP TSG-RAN WG2 Meeting #71bis, Xi'an China, Oct. 11-15, 2010 (R2-105380).

Search Report on corresponding EP Patent Application No. 11007236.0 dated Jul. 13, 2012.

3GPP TSG RAN WG2 Meeting #70, Montreal, Canada, May 10-14, 2010 (R2-103506).

Office Action on corresponding foreign application (KR10-2013-0034498) from KIPO dated Jun. 25, 2013.

3GPP TSG-RAN WG2 #70, May 10-14, 2010, Montreal, Canada (R2-102760).

3GPP TSG-RAN WG2 #70, Montreal, Canada, May 10-14, 2010 (Tdoc R2-103091).

3GPP TSG-RAN WG2 #70bis, Stockholm, Sweden, Jun. 28-Jul. 2, 2010 (Tdoc R2-104044).

Office Action on corresponding foreign application (JP2014-088684) from JPO dated Jan. 13, 2014.

3GPP TSG-RAN WG2 Meeting #71, Madrid, Spain, Aug. 23-27, 2010 (R2-104991).

3GPP TSG-RAN WG2 #69bis, Beijing, China, Apr. 12-16, 2010 Tdoc R2-101998.

Office Action on corresponding foreign application (TW 100132201) from TIPO dated Aug. 22, 2014.

* cited by examiner

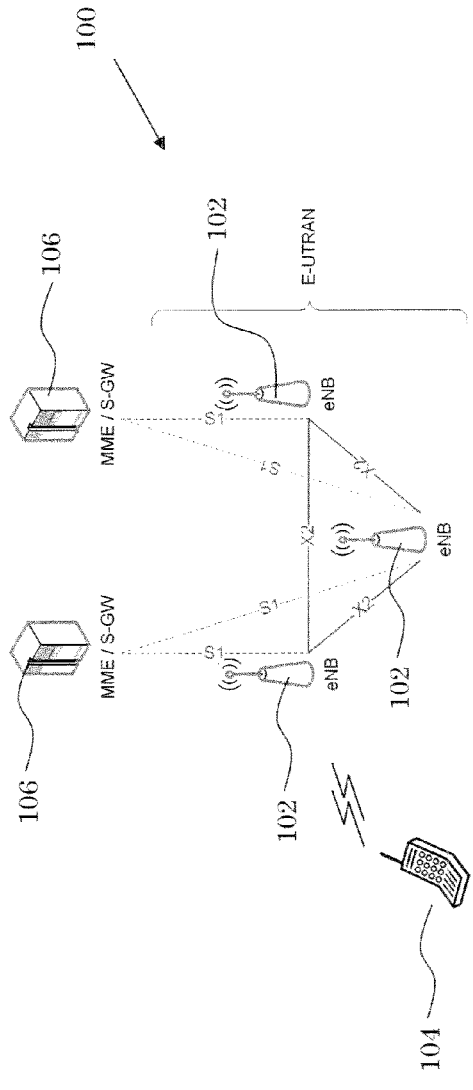
FIG. 1
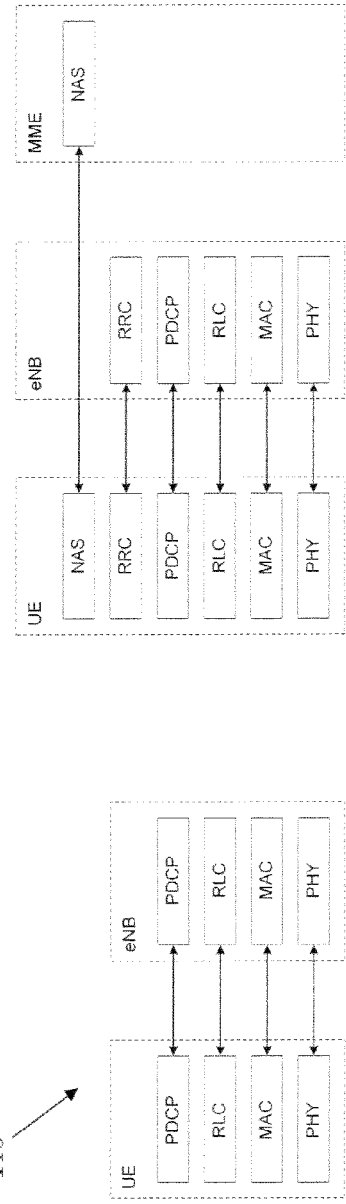
FIG. 3
FIG. 2

METHOD FOR REDUCING OVERHEAD IN A MEASUREMENT REPORT FROM A USER EQUIPMENT CONFIGURED WITH CARRIER AGGREGATION TO A NETWORK IN A WIRELESS COMMUNICATION SYSTEM

CROSS-REFERENCE TO RELATED APPLICATIONS

The present application claims the benefit of U.S. Provisional Patent Application Ser. No. 61/380,331, filed on Sep. 7, 2010, the entire disclosure of which is incorporated herein by reference.

FIELD

This disclosure generally relates to wireless communication networks, and more particularly, to a method for providing a measurement report from a User Equipment (UE) to a network in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to one aspect, a method for providing a measurement report from a UE to a network in a wireless communication system includes using a configuration to indicate whether or not a corresponding additional measurement result should be included in the measurement report, and using the configuration to indicate more than one type of additional measurement result.

According to another aspect, a communication device for use in a wireless communication system includes a control circuit, a processor installed in the control circuit, and a memory installed in the control circuit and coupled to the processor. The processor is configured to execute a program code stored in memory to provide a measurement report from a UE to a network in the wireless communication system by using a configuration to indicate whether or not a corresponding additional measurement result should be included in the measurement report, and using the configuration to indicate more than one type of additional measurement result.

According to another aspect, method for providing a measurement report from a UE to a network in a wireless communication system includes triggering a measurement report, and omitting an additional measurement result in the measurement report if the measurement report is triggered by inter-Radio Access Technology measurement linter-RAT measurement).

According to another aspect, a communication device for use in a wireless communication system includes a control circuit, a processor installed in the control circuit, and a memory installed in the control circuit and coupled to the processor. The processor is configured to execute a program code stored in memory to provide a measurement report from a LIE to a network in the wireless communication system by triggering a measurement report, and omitting an additional measurement result in the measurement report if the measurement report is triggered by inter-Radio Access Technology measurement (inter-RAT measurement).

BRIEF DESCRIPTION OF THE DRAWINGS

FIG. 1 shows a diagram of a wireless communication system according one exemplary embodiment.

FIG. 2 shows a user plane protocol stack of the wireless communication system of FIG. 1 according to one exemplary embodiment.

FIG. 3 shows a control plane protocol stack of the wireless communication system of FIG. 1 according to one exemplary embodiment.

DETAILED DESCRIPTION

Figure 4:
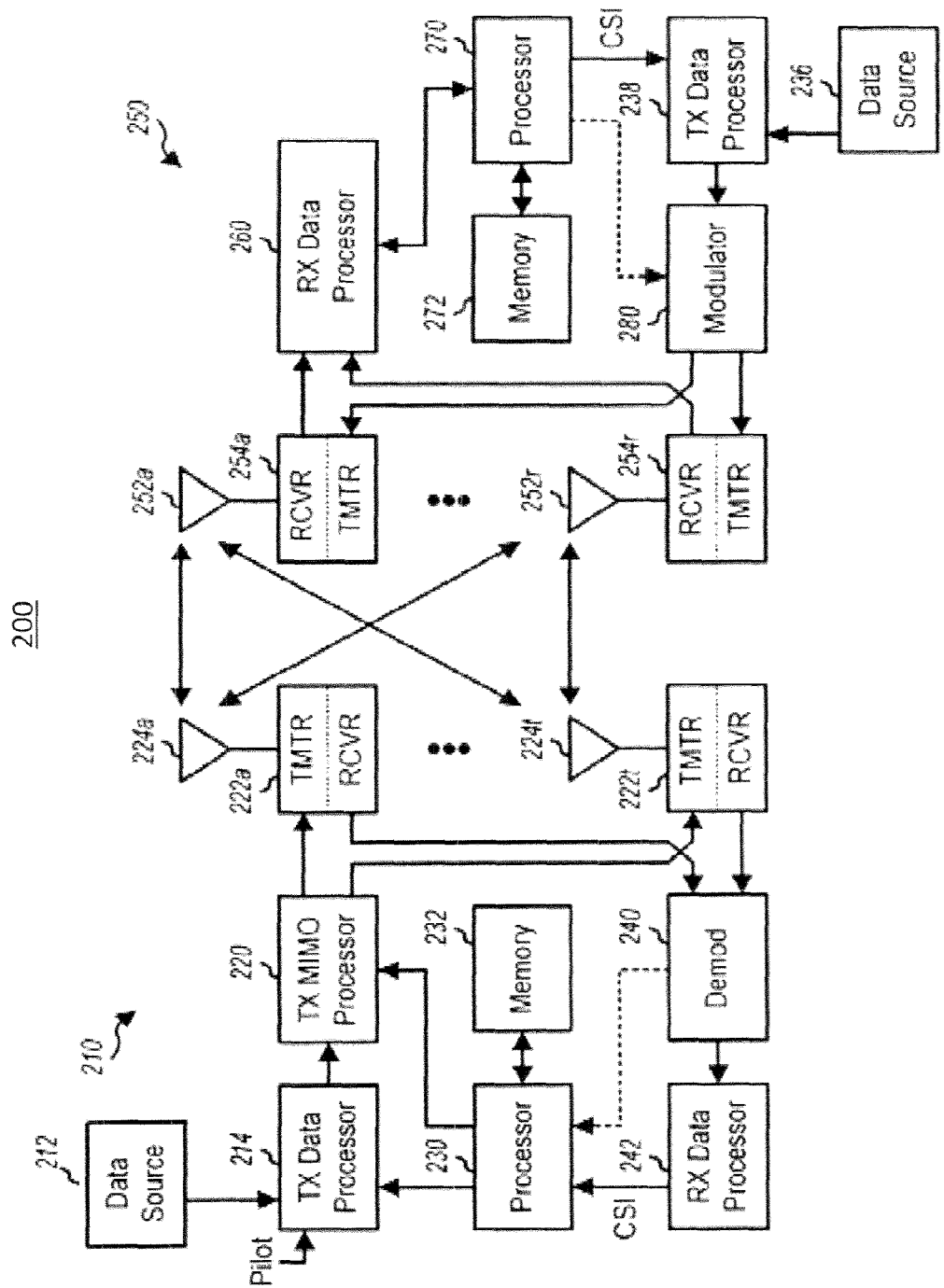
FIG. 4 is a block diagram of a transmitter system (also known as access network) and a receiver system (also known as user equipment or UE) according to one exemplary embodiment.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced), 3GPP2 UMB (Ultra Mobile Broadband). WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. 3GPP TS 36.331 v9.3.0, R2-105223, R2-106031. The standards and documents listed above are hereby expressly incorporated herein.

An exemplary network structure of an Evolved Universal Terrestrial Radio Access Network (E-UTRAN) 100 as a mobile communication system is shown in FIG. 1 according to one exemplary embodiment. The E-UTRAN system can also be referred to as a LTE (Long-Term Evolution) system or LTE-A (Long-Term Evolution Advanced). The E-UTRAN generally includes eNode B or eNB 102, which function similar to a base station in a mobile voice communication network. Each eNB is connected by X2 interfaces. The eNBs are connected to terminals or user equipment (UE) 104 through a radio interface, and are connected to Mobility Management Entities (MME) or Serving Gateway (S-GW) 106 through SI interfaces.

Referring to FIGS. 2 and 3, the LTE system is divided into control plane 108 protocol stack (shown in FIG. 3) and user plane 110 protocol stack (shown in FIG. 2) according to one exemplary embodiment. The control plane performs a function of exchanging a control signal between a UE and an eNB and the user plane performs a function of transmitting user data between the UE and the eNB. Referring to FIGS. 2 and 3, both the control plane and the user plane include a Packet Data Convergence Protocol (PDCP) layer, a Radio Link Control (RLC) layer, a Medium Access Control (MAC) layer and a physical (PHY) layer. The control plane additionally includes a Radio Resource Control (RRC) layer. The control plane also includes a Network Access Stratum (NAS) layer, which performs among other things including Evolved Packet System (EPS) bearer management, authentication, and security control.

The PHY layer provides information transmission service using a radio transmission technology and corresponds to a first layer of an open system interconnection (OSI) layer. The PHY layer is connected to the MAC layer through a transport channel. Data exchange between the MAC layer and the PHY layer is performed through the transport channel. The transport channel is defined by a scheme through which specific data are processed in the PHY layer.

The MAC layer performs the function of sending data transmitted from a RLC layer through a logical channel to the PHY layer through a proper transport channel and further performs the function of sending data transmitted from the PHY layer through a transport channel to the RLC layer through a proper logical channel. Further, the MAC layer inserts additional information into data received through the logical channel, analyzes the inserted additional information from data received through the transport channel to perform a proper operation and controls a random access operation.

The MAC layer and the RLC layer are connected to each other through a logical channel. The RLC layer controls the setting and release of a logical channel and may operate in one of an acknowledged mode (AM) operation mode, an unacknowledged mode (UM) operation mode and a transparent mode (TM) operation mode. Generally, the RLC layer divides Service Data Unit (SDU) sent from an upper layer at a proper size and vice versa. Further, the RLC layer takes charge of an error correction function through an automatic retransmission request (ARQ).

The PDCP layer is disposed above the RLC layer and performs a header compression function of data transmitted in an IP packet form.

The RRC layer is only defined in the control plane. The RRC layer controls logical channels, transport channels and physical channels in relation to establishment, re-configuration and release of Radio Bearers (RBs). Here, the RB signifies a service provided by the second layer of an OSI layer for data transmissions between the terminal and the E-UTRAN. If an RRC connection is established between the RRC layer of a UE and the RRC layer of the radio network, the UE is in the RRC connected mode. Otherwise, the UE is in an RRC idle mode.

FIG. 4 is a simplified block diagram of an exemplary embodiment of a transmitter system 210 (also known as the access network) and a receiver system 250 (also known as access terminal or LTE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g. BPSK. QPSK. M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g. for OFDM). TX MIMO processor 220 then provides $N_T$ modulation symbol streams to $N_T$ transmitters (TMTR) 222a through 222t. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MAIO channel. $N_T$ modulated signals from transmitters 222a through 222t are then transmitted from $N_T$ antennas 224a through 224t, respectively.

At receiver system 250, the transmitted modulated signals are received by $N_R$ antennas 232a through 252r and the received signal from each antenna 252 is provided to a respective receiver (RCVR) 254a through 234r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238. Which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 5:
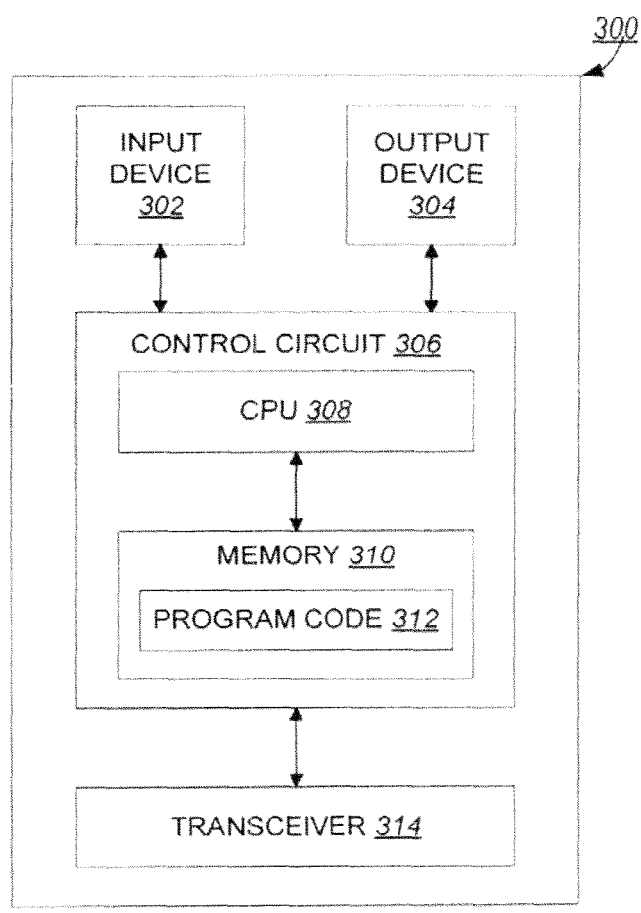
FIG. 5 is a functional block diagram of a UE according to one exemplary embodiment.

Turning to FIG. 5, this figure shows an alternative simplified functional block diagram of a communication device according to one exemplary embodiment. The communication device 300 in a wireless communication system can be utilized for realizing the UE 104 in FIG. 1, and the wireless communications system is preferably the LTE system, the LTE-A system or the like. The communication device 300 may include an input device 302, an output device 304, a control circuit 306, a central processing unit (CPU) 308, a memory 310, a program code 312, and a transceiver 314. The program code 312 includes the application layers and the layers of the control plane 108 and layers of user plane 110 as discussed above except the PHY layer. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Handover is controlled by the eNB to handover a UE from source cell to target cell. A serving cell denotes the cell that the UE is connected to, while the neighbor cell may be another cell in close proximity on the same frequency (intra-frequency neighbor cell), or on a different frequency (inter-frequency neighbor cell). The neighbor cell may also use a different Radio Access Technology (inter-RAT neighbor cell). Handover is a UE assisted handover, which means that the UE may assist the eNB in taking the decision for handover. This is achieved by the UE by sending a measurement report to the eNB about the neighbor cells. The measurement report contains information about serving and neighbor cells such as received signal strength at the UE. The eNB may use the information in the measurement report about the serving cell and neighbor cells and make a final decision on whether or not it should command the UE to perform handover.

Measurement configurations are controlled by the eNB. In other words, the eNB tells the UE when to perform measurements, what to measure, and how to report. Such controlling information sent from the eNB to the UE includes for example information regarding how measurements should be filtered, different thresholds for the triggers that trigger the measurement report, what to measure, how to report, and what to include in the measurement report.

LTE-A is designed to meet higher bandwidth requirements both in the DL and UL directions. In order to provide the higher bandwidth requirements. LTE-A utilizes component carrier aggregation, A user equipment (UE) with reception and/or transmission capabilities for carrier aggregation (CA) can simultaneously receive and/or transmit on multiple component carriers (CCs). A carrier may be defined by a bandwidth and a center frequency.

For each UE configured with CA, a CC is defined as its primary cell (PCell). Different UEs may not necessarily use the same CC as their PCell. The PCell can be regarded as the anchor carrier for the LIE and is thus used for basic functionalities such as radio link failure monitoring. If more than one CC is configured for a UE, the additional CCs are denoted as Secondary Cells (SCell) for the LIE. SCells are used to provide additional downlink and optionally uplink radio resources.

In LTE-A, before sending the handover message to the LEE, the source eNB prepares one or more target cells. The source eNB selects the target PCell. The source eNB may also provide the target eNB with a list of cells, in order of decreasing radio quality, which includes the best cell on each frequency for which measurement information is available. The source may also include available measurement information. The target eNB decides which SCells are configured for use after handover, which may include cells other than the ones indicated by the source eNB.

For a LIE configured with CA, default inclusion of serving cell quality in the UE measurement report may be extended to include all of the configured serving cells. Furthermore, the UE may include in a measurement report additional available measurements concerning the best non-serving cell on carriers other than the carrier of the object reference by the measurement identification. Also, additional measurement reporting is limited to carriers with a configured measurement identification and a configured SCell.

An example of the message structure of the additional measurement report for CA is described in R2-104991 (3GPP TSG-RAN WG2 Meeting #7, Madrid, Spain, 23-27 Aug. 2010), the entire disclosure of which is incorporated by reference herein. The additional measurement report includes the measurement result of the configured SCell(s), whose structure can be represented by the IE measResultSCellList-r10, and/or the measurement result of the best non-serving cell on the carriers of the configured SCell(s), whose structure can be represented by the IE addMeasResultListEUTRA-r10. Additional constraint may be applied to the measurement result included in addMeasResultListEUTRA-r10, for example, the measurement result is limited to the carrier with a configured measurement identification and/or other than the object referenced by the measurement identification of the measurement report. Assuming that the number of SCells configured for a UE is n, the estimated size of the additional measurement result is (6+n*43) bits (measResultSCellList-r10: (3+n*16) bits and addMeasResultListEUTRA-r10: (3+n*27) bits). According to R2-104314 (GPP TSG-RAN WG2 meeting #71, Madrid, Spain, Aug. 23-27, 2010), the entire disclosure of which is incorporated by reference herein, Measurement Report size may be 128 bits for mobility enhancement study in Rel-9 (LTE Release 9). For CA (LIE Rel-10), there is typically 1 or 2 SCells for a UE, so the additional overhead will be 49 bits (38% overhead) when n=1 and 92 bits (72% overhead) when n=2.

To reduce the signalling overhead, methods are disclosed herein that provide a signalling, reduction mechanism. The methods described herein include limiting the applicability of the additional measurement result, such as the type of measurement result added after Rel-9. One type of additional measurement result is the measurement result for SCells. Another type of additional measurement result is the measurement result for the best non-serving cells. Additional constraint may be applied to the additional measurement result. Both of these measurement results may be included in the same Measurement Report message.

According to the first embodiment, the configuration of the measurement result for the best non-serving cells, for example, which event-triac, red measurement report should include the measurement result for the best non-serving cells, can be applied to other additional measurement results, such as the measurement results for SCells, to reduce signalling overhead.

Figure 6:
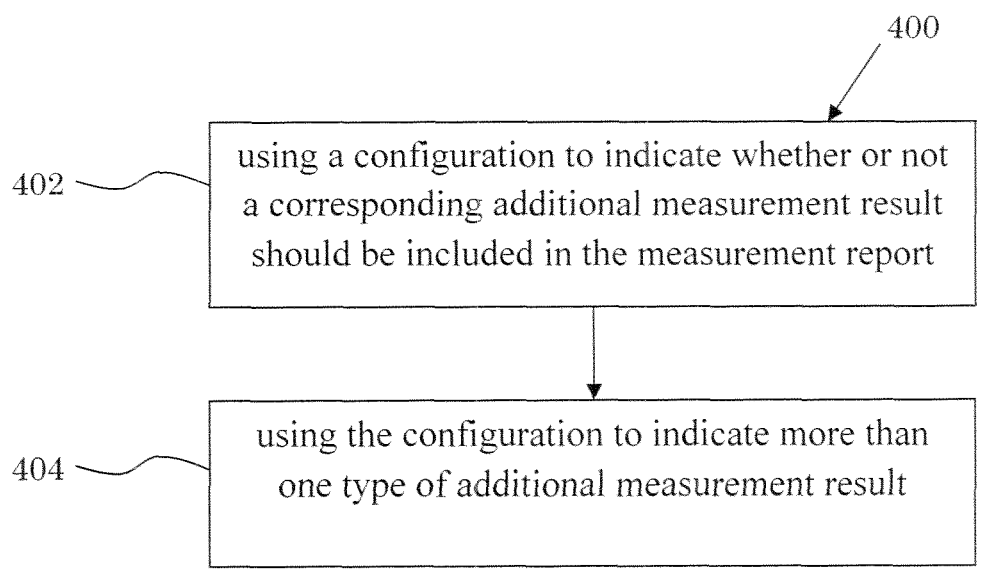
FIG. 6 shows a method of for providing a measurement report from a UE to a network in a wireless communication system according to one exemplary embodiment.

Referring to FIG. 6, a method 400 according to the first exemplary embodiment for providing a measurement report from a UE to a network in a wireless communication system includes at 402 using a configuration to indicate whether or not a corresponding additional measurement result should be included in the measurement report. The method further includes at 404 using the configuration to indicate more than one type of additional measurement result. Thus, the additional measurement result is only included when indicated by the indicator, thereby reducing the signalling overhead associated with reporting the measurement report for CA.

The type of additional measurement results can be the measurement result for SCell. The measurement result for SCell may be the measurement result of all configured SCell(s) for the UE. The type of additional measurement results can be the measurement result for best non-serving cells. The measurement result for the best non-serving cells may be the measurement result of the best non-serving cell on carriers other than the carrier of the object reference by the measurement identification in the measurement report. The measurement result for best non-serving cells may be limited to the carriers with the configured measurement identification and the configured SCell.

The configuration as used in this embodiment is associated with a triggering event which can trigger a measurement report. Furthermore, the configuration may be included in the measurement report configuration (IE reportConfig), the measurement configuration (IE measConfig) and/or a RRC Connection Reconfiguration message.

According to the second embodiment, the additional measurement result is omitted by the UE under certain conditions to reduce signalling overhead.

Figure 7:
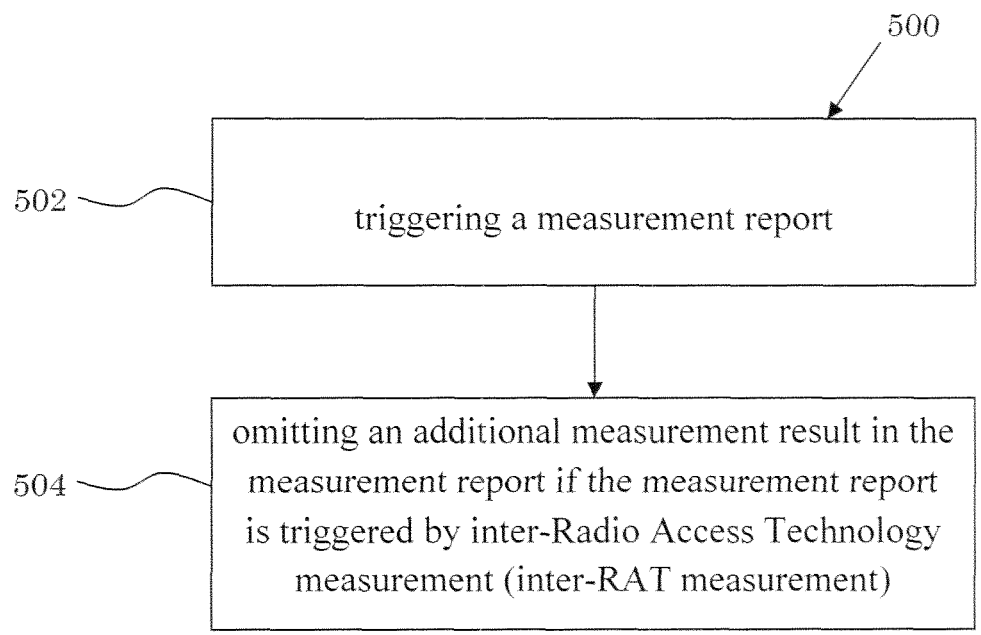
FIG. 7 shows a method of for providing a measurement report from a UE to a network in a wireless communication system according to another exemplary embodiment.

Referring to FIG. 7, a method 500 according to the second exemplary embodiment for providing a measurement report from a UE to a network in a wireless communication system includes at 502 triggering a measurement report, and at 504 omitting an additional measurement result in the measurement report if the measurement report is triggered by inter-Radio Access Technology measurement (inter-RAT measurement). Including additional measurement result in a measurement report increases the size of the measurement report. Omitting some additional measurement result in the measurement report triggered by inter-RAT measurement enables that not every measurement report carries all the additional measurement result, and thus reduce the signaling overhead of reporting a measurement report triggered by inter-RAT measurement.

The type of additional measurement results can be the measurement result for SCell. The measurement result for SCell may be the measurement result of all configured SCell(s) for the UE. The type of additional measurement results can be the measurement result for best non-serving cells. The measurement result for the best non-serving cells may be the measurement result of the best non-serving cell on carriers other than the carrier of the object reference by the measurement identification in the measurement report. The measurement result for best non-serving cells may be limited to the carriers with the configured measurement identification and the configured SCell.

The inter-RAT measurement is a measurement concerning UTRA/GERAN/CDMA2000 frequencies. The measurement identification in the measurement report is associated with the measurement object other than an E-UTRA carrier. The measurement report may be triggered when the measured result of some inter-RAT neighbor cell becomes better than a predefined threshold. The triggering event is defined as Event B1: Inter-RAT neighbor becomes better than threshold. Alternately, the measurement report may be triggered when the measured result of the serving PCell becomes worse than a predefine threshold and the measured result of some inter-RAT neighbor cell becomes better than another predefined threshold. The triggering event is defined as Event B2: serving becomes worse than threshold1 and inter-RAT neighbor becomes better than threshold2. The detail description of Event B1 and Event B2 are stated in 3GPP TS 36.331 v9.3.0 section 5.5.4.7 and 5.5.4.8, respectively. According to the second exemplary embodiment, there may be no configuration for the Event to indicate whether the additional measurement result should be included in the measurement report triggered by the Event. According to the second embodiment, carrier aggregation may be configured for the UE. Furthermore, at least one SCell may be configured for the UE.

Referring back to FIG. 5, which is a functional block diagram of a IE according to one exemplary embodiment, the UE 300 includes a program code 312 stored in memory 310. The CPU 308 executes the program code 312 to perform the steps of method of the first embodiment or the steps of the method of the second embodiment as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two. Which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices. e.g. a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory. ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for providing a measurement report from a User Equipment (UE) to a network in a wireless communication system, the method comprising:
    triggering a measurement report, the measurement report including a measurement result;
    wherein an additional measurement result is included in the measurement report if the measurement report is not triggered by inter-Radio Access Technology measurement (inter-RAT measurement) and inclusion of the additional measurement result in the measurement report is configured; and
    the additional measurement result is omitted from the measurement report if the measurement report is triggered by inter-RAT measurement.

2. The method of claim 1, wherein the additional measurement result includes a measurement result for Secondary Cells (SCells).

3. The method of claim 2, wherein the measurement result for SCells refers to a measurement result of all configured SCells for the UE.

4. The method of claim 1, wherein the inter-RAT measurement is a measurement concerning UTRA/GERAN/CDMA2000 frequencies.

5. The method of claim 1, wherein the measurement identification in the measurement report is associated with the measurement object other than an E-UTRA carrier.

6. The method of claim 1, wherein the measurement report is triggered by Event B1: Inter-RAT neighbor becomes better than threshold.

7. The method of claim 6, wherein there is no configuration for the Event to indicate whether the additional measurement result should be included in the measurement report triggered by the Event.

8. The method of claim 1, wherein the measurement report is triggered by Event B2: serving becomes worse than threshold1 and inter-RAT neighbor becomes better than threshold2.

9. The method of claim 8, wherein there is no configuration for the Event to indicate whether the additional measurement result should be included in the measurement report triggered by the Event.

10. The method of claim 1, wherein carrier aggregation is configured for the UE.

11. The method of claim 1, wherein at least one SCell is configured for the UE.

12. The method of claim 1, wherein the additional measurement result includes a measurement result for best non-serving cells.

13. The method of claim 12, wherein the measurement result for the best non-serving cells refers to a measurement result of the best non-serving cells on carriers other than a carrier of an object reference by the measurement identification in the measurement report.

14. The method of claim 12, wherein the measurement result for best non-serving cells is limited to the carriers with a configured measurement identification and a configured SCell.

15. A communication device for use in a wireless communication system, the communication device comprising:
    a control circuit;
    a processor installed in the control circuit; and
    a memory installed in the control circuit and coupled to the processor;
    wherein the processor is configured to execute a program code stored in memory to provide a measurement report from a User Equipment (UE) to a network in a wireless communication system by:

triggering a measurement report, the measurement report including a measurement result;

wherein an additional measurement result is included in the measurement report if the measurement report is not triggered by inter-Radio Access Technology measurement (inter-RAT measurement) and inclusion of the additional measurement result in the measurement report is configured; and the additional measurement result is omitted from the measurement report if the measurement report is triggered by inter-RAT measurement.

16. The communication device of claim 15, wherein the additional measurement result includes a measurement result for Secondary Cells (SCells).

17. The communication device of claim 16, wherein the measurement result for SCells refers to a measurement result of all configured SCells for the UE.

18. The communication device of claim 15, wherein the additional measurement result includes a measurement result for best non-serving cells.

19. The communication device of claim 18, wherein the measurement result for the best non-serving cells refers to a measurement result of the best non-serving cells on carriers other than a carrier of an object reference by the measurement identification in the measurement report.

20. The communication device of claim 18, wherein the measurement result for best non-serving cells is limited to the carriers with a configured measurement identification and a configured SCell.

21. The communication device of claim 15, wherein the inter-RAT measurement is a measurement concerning UTRA/GERAN/CDMA2000 frequencies.

22. The communication device of claim 15, wherein the measurement identification in the measurement report is associated with the measurement object other than an E-UTRA carrier.

23. The communication device of claim 15, wherein the measurement report is triggered by Event B1: Inter-RAT neighbor becomes better than threshold.

24. The communication device of claim 23, wherein there is no configuration for the Event to indicate whether the additional measurement result should be included in the measurement report triggered by the Event.

25. The communication device of claim 15, wherein the measurement report is triggered by Event B2: serving becomes worse than threshold1 and inter-RAT neighbor becomes better than threshold2.

26. The communication device of claim 25, wherein there is no configuration for the Event to indicate whether the additional measurement result should be included in the measurement report triggered by the Event.

27. The communication device of claim 15, wherein carrier aggregation is configured for the UE.

28. The communication device of claim 15, wherein at least one SCell is configured for the UE.

* * * * *